United States Patent
Cho

(10) Patent No.: US 9,942,765 B2
(45) Date of Patent: Apr. 10, 2018

(54) ELECTRONIC DEVICE AND METHOD FOR PROVIDING SERVICE INFORMATION

(71) Applicant: Samsung Electronics Co., Ltd., Suwon-si, Gyeonggi-do (KR)

(72) Inventor: Joon-Ho Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 14/691,977

(22) Filed: Apr. 21, 2015

(65) Prior Publication Data

US 2015/0319614 A1 Nov. 5, 2015

(30) Foreign Application Priority Data

May 2, 2014 (KR) ........................ 10-2014-0053441

(51) Int. Cl.
| | |
|---|---|
| *G06F 15/16* | (2006.01) |
| *H04W 12/10* | (2009.01) |
| *H04L 9/32* | (2006.01) |
| *H04W 12/04* | (2009.01) |
| *H04W 12/06* | (2009.01) |
| *H04L 29/06* | (2006.01) |
| *H04W 4/02* | (2018.01) |

(52) U.S. Cl.
CPC ........... *H04W 12/10* (2013.01); *H04L 9/3247* (2013.01); *H04L 63/0823* (2013.01); *H04L 63/12* (2013.01); *H04L 63/168* (2013.01); *H04W 4/02* (2013.01); *H04W 12/04* (2013.01); *H04W 12/06* (2013.01)

(58) Field of Classification Search
CPC ..... H04W 12/04; H04W 12/06; H04W 12/10; H04W 4/021; H04L 9/3247; H04L 63/12; H04L 63/0823
See application file for complete search history.

(56) References Cited

U.S. PATENT DOCUMENTS

| | | | | |
|---|---|---|---|---|
| 8,335,831 | B2 * | 12/2012 | Fan ..................... | H04L 12/1859 |
| | | | | 709/202 |
| 2002/0188562 | A1 * | 12/2002 | Igarashi ............... | G06Q 20/102 |
| | | | | 705/40 |
| 2004/0203863 | A1 * | 10/2004 | Huomo .................. | H04W 4/02 |
| | | | | 455/456.1 |
| 2007/0036102 | A1 * | 2/2007 | Hwang ................. | H04H 20/93 |
| | | | | 370/328 |
| 2013/0201399 | A1 * | 8/2013 | Kitazato .................. | H04N 5/44 |
| | | | | 348/553 |
| 2014/0220939 | A1 * | 8/2014 | Takae .................... | H04W 12/08 |
| | | | | 455/411 |

\* cited by examiner

*Primary Examiner* — Khoi Le
(74) *Attorney, Agent, or Firm* — Jefferson IP Law, LLP

(57) ABSTRACT

A method of providing service information using an electronic device is provided. The method includes receiving a service information packet, determining whether a service IDentification (ID) included in the received service information packet is a registered service ID, determining whether a service condition corresponding to the service ID and a registered condition are matched, and in response to determining that the service condition corresponding to the service ID and the registered condition are matched, displaying information corresponding to the matched condition.

15 Claims, 8 Drawing Sheets

ELECTRONIC DEVICE AND METHOD FOR PROVIDING SERVICE INFORMATION

CROSS-REFERENCE TO RELATED APPLICATION(S)

This application claims the benefit under 35 U.S.C. § 119(a) of a Korean patent application filed on May 2, 2014 in the Korean Intellectual Property Office and assigned Serial number 10-2014-0053441, the entire disclosure of which is hereby incorporated by reference.

TECHNICAL FIELD

The present disclosure relates to an electronic device that provides information associated with a service. More particularly, the present disclosure relates to an electronic device and method for providing service information using a network.

BACKGROUND

Generally, whether or not a user device enters into a service area may need to be detected so that a service device provides a region of interest service. To this end, a user absolute location information method (e.g., a geo-fencing method) and a proximity method that detects a wireless device which is representative of a service area and detects entry of a user, may be used.

FIG. 1 is a diagram illustrating a location information method and a proximity method according to the related art.

Referring to FIG. 1, a location information method 110 operates a Global Positioning System (GPS) or a WiFi Positioning System (WPS) in an electronic device of a user, so as to determine whether the electronic device of the user exists in a service area on a map. Because the service area is set on the map, various types and sizes of service areas may be set.

A proximity method 120 is a technology in which a service device detects an electronic device of a proximate user using wireless technologies such as WiFi, Bluetooth, Zigbee, Near Field Communication (NFC), an ultrasonic scheme, and the like, and provides services accordingly.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a location information method consumes a large amount of power because a Global Positioning System (GPS) and a Wi-Fi Positioning System (WPS) in an electronic device are used, and has high infrastructural investment costs because an electronic device needs to periodically update a required map when the electronic device uses a WPS.

Another aspect of the present disclosure is to provide a proximity method needs to configure a wireless network-based service device and an individual application corresponding to the service device. After an individual service application stored in an electronic device is executed, only a service device specified for a corresponding service is monitored and thus, the corresponding service application needs to execute monitoring. This may increase consumption of a battery unnecessarily. In addition, an electronic device fails to recognize services provided in surroundings when a user does not recognize the services provided in surroundings and thus, may fail to inform the user that the user enters into a predetermined service area.

Another aspect of the present disclosure is to provide a service providing device that uses the proximity method may be counterfeited or falsified and may lack security and thus, may reduce utility of a service of a user when cash information is included in service information.

Another aspect of the present disclosure is to provide a method of providing a service in a region of interest by monitoring, in an integrative manner, a plurality of service devices on behalf of various service applications of an electronic device.

In addition, an electronic device of the present disclosure may include a function of calculating a distance to a service device using a Received Signal Strength Indicator (RSSI) of a signal received from the service device. Accordingly, the electronic device recognizes the distance to the service device and, when the recognized distance satisfies a predetermined distance condition, provides a user with a notification or executes a corresponding service application.

In accordance with another aspect of the present disclosure, a method of providing service information using an electronic device is provided. The method includes receiving a service information packet, determining whether a service Identification (ID) included in the received service information packet is a registered service ID, determining whether a service condition corresponding to the service ID and a registered condition are matched, and in response to determining that the service condition corresponding to the service ID and the registered condition are matched, displaying information corresponding to the matched condition.

In accordance with another aspect of the present disclosure, a method for a service device to provide service information to an electronic device is provided. The method includes storing a public key associated with at least one electronic device, so as to broadcast service information to the at least one electronic device, and transmitting, to the at least one electronic device, a service information packet including at least one of a service ID, a service condition, a notification message ID, and an encoded digital signature.

In accordance with another aspect of the present disclosure, an electronic device that provides service information is provided. The electronic device includes a transceiving unit configured to receive a service information packet, and a controller configured to determine whether a service ID included in the received service information packet is a registered service ID, to determine whether a service condition corresponding to the service ID and a registered condition are matched, and to display information corresponding to the matched condition in response to determining that the service condition corresponding to the service ID and the registered condition are matched.

In accordance with another aspect of the present disclosure, a service device that provides service information to an electronic device is provided. The service device includes a storage unit configured to store a private key associated with at least one electronic device, a transceiving unit configured to broadcast service information to the at least one electronic device, and a controller configured to perform a control to transmit a service information packet including at least one of a service ID, a service condition, a notification message ID, and an encoded digital signature to the at least one electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
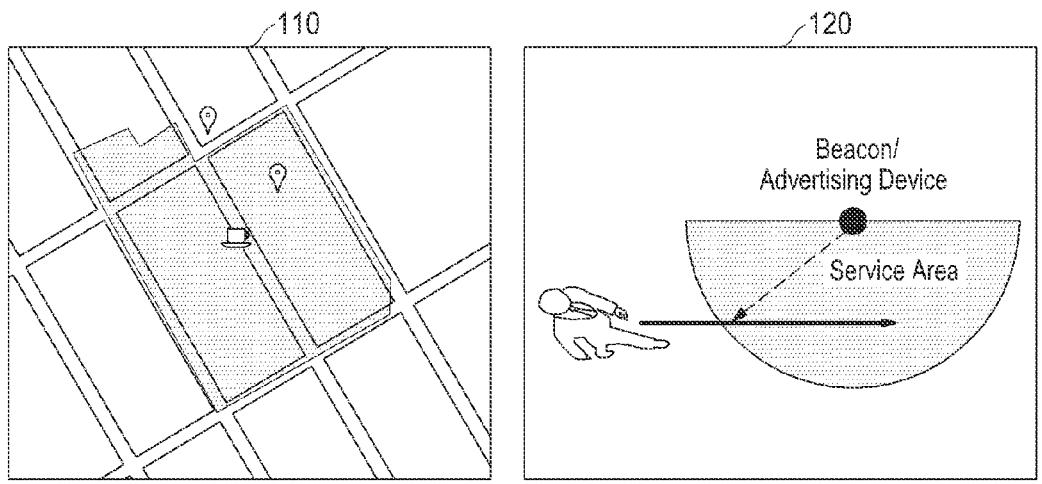
FIG. 1 is a diagram illustrating a location information method and a proximity method according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Because the present disclosure can be changed in different forms and has various embodiments, the specific embodiments will be described with reference to the drawings. However, the embodiments do not limit the present disclosure to a specific implementation, but should be construed as including all modifications, equivalents, and replacements included in the spirit and scope of the present disclosure.

Although the terms including an ordinal number such as first, second, and/or the like can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items.

In the present disclosure, the terms are used to describe a specific embodiment, and are not intended to limit the present disclosure. Singular forms are intended to include plural forms unless the context clearly indicates otherwise. In the description, the terms "include" or "have" should be understood to indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. The terms, which are identical to those defined in general dictionaries, should be interpreted to have the meaning identical to that in the context of the related technique. The terms should not be ideally or excessively interpreted as a formal meaning.

Hereinafter, an operation principle for an embodiment of the present disclosure will be described in detail with reference to the accompanying drawings. In the following description of embodiments of the present disclosure, a detailed description of known functions or configurations incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be determined based on the contents throughout the specification.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Therefore, various embodiments of the present disclosure will provide a method and apparatus which improves drawbacks of a proximity method, detects a service area, and provides a user (e.g., to an electronic device) with a notification message. In addition, there is provided a method and apparatus that provides a user with service information using voice or text, through notification of a service or execution of a service application, so as to provide the notification message. In addition, there is provided a method and apparatus that provides a user with notification of a predetermined service, such as a coupon, in a service area, without execution of a predetermined service application in an electronic device, and a user begins the corresponding service application as the notification is received. In addition, there is provided a framework through which a developer or a service provider may readily embody a service.

According to various embodiments of the present disclosure, an electronic device may need or otherwise wish to interact with a stationary service device that indicates a corresponding service area and a service application. Accordingly, a service device that is proximate to the electronic device may send information that may provide a service.

For example, when an electronic device drives a service application corresponding to a service device, a user may be provided with corresponding information through the application. In this example, the electronic device may receive service information through a beacon (probe) signal or an advertising packet from the service device, and the application of the electronic device may interpret service information included in the advertising packet and execute a corresponding operation. The advertising packet may include information, or may include information dependent upon a predetermined service scenario. Therefore, the electronic device may provide a service provided by the information. As another example, after an individual service application stored in an electronic device is executed, the electronic device may monitor a service device corresponding to a corresponding service. In this instance, the electronic device always executes monitoring with respect to a service application corresponding to the service device, so as to continuously determine whether the electronic device enters into a service area of the service device. For example, the monitoring operation may control a service application included in the electronic device to be in an active state so as to monitor a corresponding service device.

In this instance, a plurality of service applications of the electronic device may monitor corresponding service devices at corresponding periods and thus, each service application included in the electronic device may maintain an active state. As another example, to reduce the consumption of a battery of an electronic device, a user may directly execute and terminate a service application when it is required (or otherwise desired), for recognizing a corresponding service device.

Figure 2:
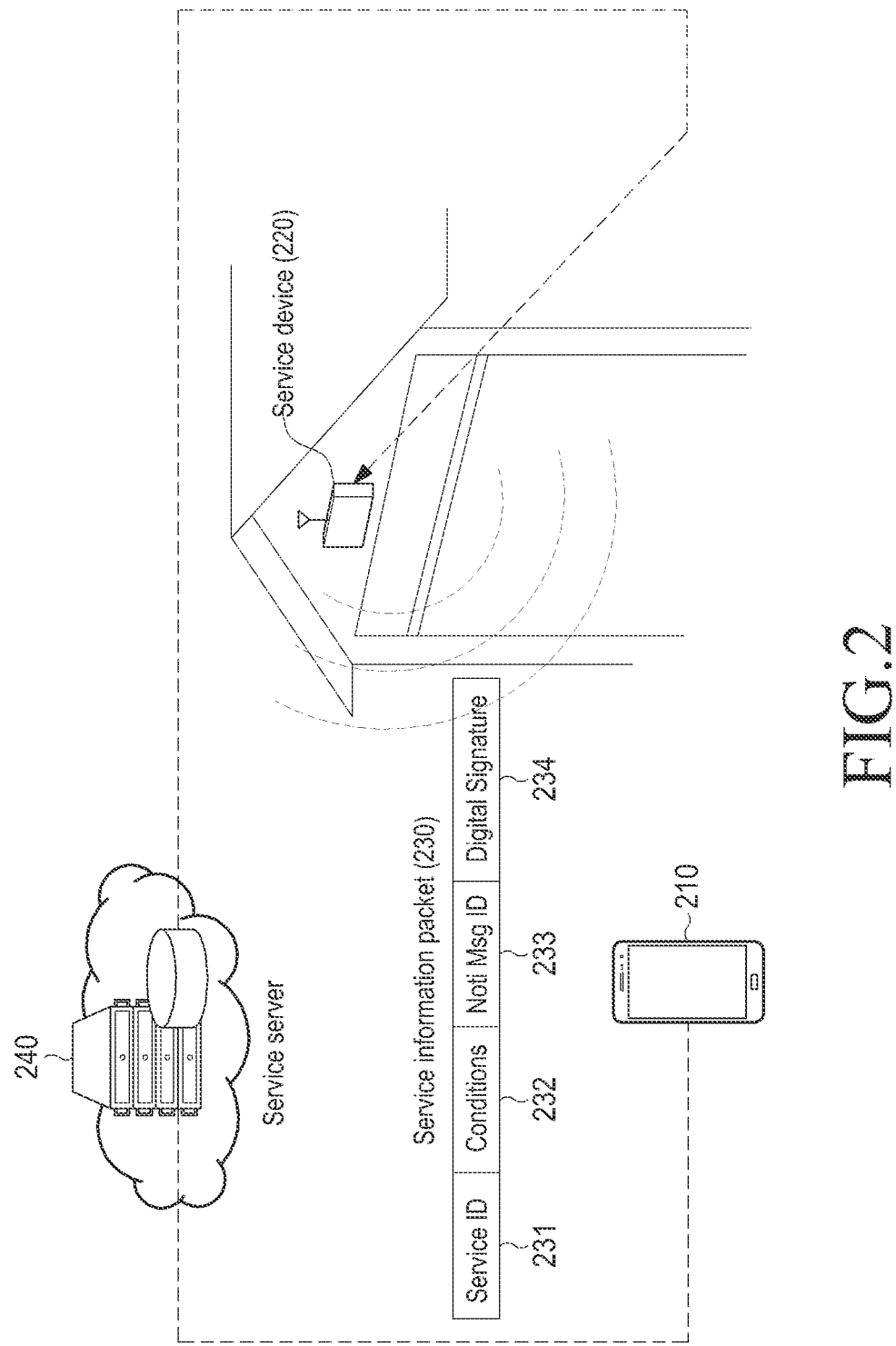
FIG. 2 illustrates a system according to an embodiment of the present disclosure.

FIG. 2 illustrates a system according to an embodiment of the present disclosure.

Referring to FIG. 2, according to various embodiments of the present disclosure, the system may include an electronic device 210, a service device 220, and a service server 240.

According to various embodiments of the present disclosure, the electronic device 210 may be capable of performing data transmission/reception and a voice/video call. For example, the electronic device 210 may be a mobile terminal. The electronic device 210 may include at least one display unit, and each display unit may display a result of execution of at least one application. The electronic device 210 may include a smart phone, a tablet PC, 3D-TeleVision (TV), a smart TV, a Light Emitting Diode (LED) TV, a Liquid Crystal Display (LCD) TV, a table PC, and the like, and also may include all devices which may communicate with a peripheral device or another terminal located at a remote place. Further, at least one screen included in the electronic device 210 may receive an input by at least one of a touch and a hovering. The at least one display unit of the electronic device 210 may provide a user with user interfaces corresponding to various services, for example, calling, data transmission, broadcasting, photographing, inputting a character string, and/or the like. Each display unit may include a hovering recognition device that recognizes an input provided using a hovering of at least one of an input unit and a finger, and a touch recognition device that recognizes (e.g., detects) an input provided using a touch of at least one of a finger and an input unit, which are referred to as a hovering recognition panel and a touch panel, respectively. Each display unit may transmit an analog signal, which corresponds to at least one touch or at least one hovering input into a user interface, to a corresponding screen controller. As described above, the electronic device 210 may include a plurality of display units, and each of the display units may include a screen controller for receiving an analog signal corresponding to a touch or a hovering. Each screen may be connected with plural housings through hinge connections, respectively, or the plural screens may be located at one housing without the hinge connection. According to various embodiments of the present disclosure, the electronic device 210 may include at least one display unit as described above, and the case in which a single display unit is used will be described hereinafter for ease of the description.

According to the various embodiments of the present disclosure, the input unit may include at least one of a finger, an electronic pen, a digital type pen, a pen without an integrated circuit, a pen with an integrated circuit, a pen with an integrated circuit and a memory, a pen capable of performing short-range communication, a pen with an additional ultrasonic detector, a pen with an optical sensor, a joystick, a stylus pen, and/or the like. The input unit may provide a command or an input to the electronic device 210 in a state of being in contact with a digitizer, or in a noncontact state such as a hovering.

According to various embodiments of the present disclosure, the electronic device 210 may include all devices that may communicate with a peripheral device or another terminal located in a remote place. The electronic device 210 may include a Bluetooth communication device, a Near Field Communication (NFC) device, a WiFi Direct communication device, and a wireless Access Point (AP), which may wirelessly access a network, and/or the like. Further, the electronic device 210 may be wiredly or wirelessly connected with another electronic device, for example, a portable terminal, a smart phone, a tablet PC, a desktop PC, an input device, a camera, the service server 240, and the service device 220. The electronic device 210 may receive, from the service device 220, a service information packet 230 including at least one of a service Identification (ID) 231, a service condition 232, a notification message ID 233, an encoded digital signature 234, and/or the like. In addition, the electronic device 210 may include a monitoring system, and may register, on the monitoring system, at least one of a service ID, a service condition, a public key, and a message table cache, before receiving the service information packet. In addition, to verify the validity of a service device and a service information packet, the electronic device 210 may decode the service information packet using a public key corresponding to a company that provides the service device.

According to various embodiments of the present disclosure, the electronic device 210 receives a service information packet 230, determines whether a service ID 231 included in the received service information packet 230 corresponds to a registered service ID, determines whether a service condition 232 corresponding to the service ID 231 and a registered condition are matched, and displays information corresponding to the matched condition. For example, the information corresponding to the matched condition may include a coupon, an event, a notification, and/or the like. In addition, as another example, a corresponding service application may be executed based on the matched condition.

According to various embodiments of the present disclosure, the service device 220 may include a service provider, a Bluetooth Low Energy (BLE) tag, anchor, and/or the like, and may be connected with the electronic device 210 and the service server 240. In addition, the service device 220 may periodically broadcast (or otherwise communicate) a service information packet 230, and the service information packet 230 may include at least one of a service ID 231, a service condition 232, a notification message ID 233, an encoded digital signature 234, and/or the like. The encoded digital signature 234 indicates an encoded value obtained by encoding a part of the service information packet 230 using a private key. In addition, the service device 220 receives a service ID 231, a service condition 232, and a notification message ID 233 associated with a predetermined service from the service server 240, and updates information included in an existing service information packet. In addition, the service device 220 may be the electronic device 210. In this instance, the electronic device 210 may broadcast (or otherwise communicate) a message corresponding to a service information packet 230 obtained from a service server, to at least one different electronic device.

According to various embodiments of the present disclosure, the service server 240 may be determined based on a type of service provided. For example, the service server 240 may be a server operated by a predetermined company that sells a predetermined product (e.g., Starbucks, Subway, and/or the like). In addition, the service server 240 may update a value of a field included in a service information packet broadcasted (or otherwise communicated) by the service device 220, and may transfer the same to the service device 220. In addition, the service device 240 may be the electronic device 210. In this case, the service server 210 may also update a value of a field included in a service information packet 230 broadcasted (or otherwise communicated) by the service device 220, and transfers the same to the service device 220.

According to various embodiments of the present disclosure, the service device 220 may broadcast (or otherwise communicate) a service information packet 230 to the electronic device 210. The service information packet 230 may include a service ID 231, a service condition 232, a notification message ID 233, and a digital signature 234.

According to various embodiments of the present disclosure, the service ID 231 may be determined based on a type of service provided. For example, the service ID 231 may be an ID allocated based on a server operated by a predetermined company (e.g., Starbucks, Subway, and/or the like), which sells a predetermined product or desires consumption of users. As another example, the service ID 231 may be provided separately based on a corresponding branch of a predetermined company or a type of service.

According to various embodiments of the present disclosure, the service condition 232 may be determined by a service provider that provides a service to a user (e.g., a predetermined company). For example, a service condition may be information including a location of a service device, a type of event, a class of a user, and/or the like, and information indicating the service condition may be included in at least one of field of a service information packet. In addition, the service condition may further include a predetermined date, the number of visitors in a shop including a service device, and/or the like.

Figure 9:
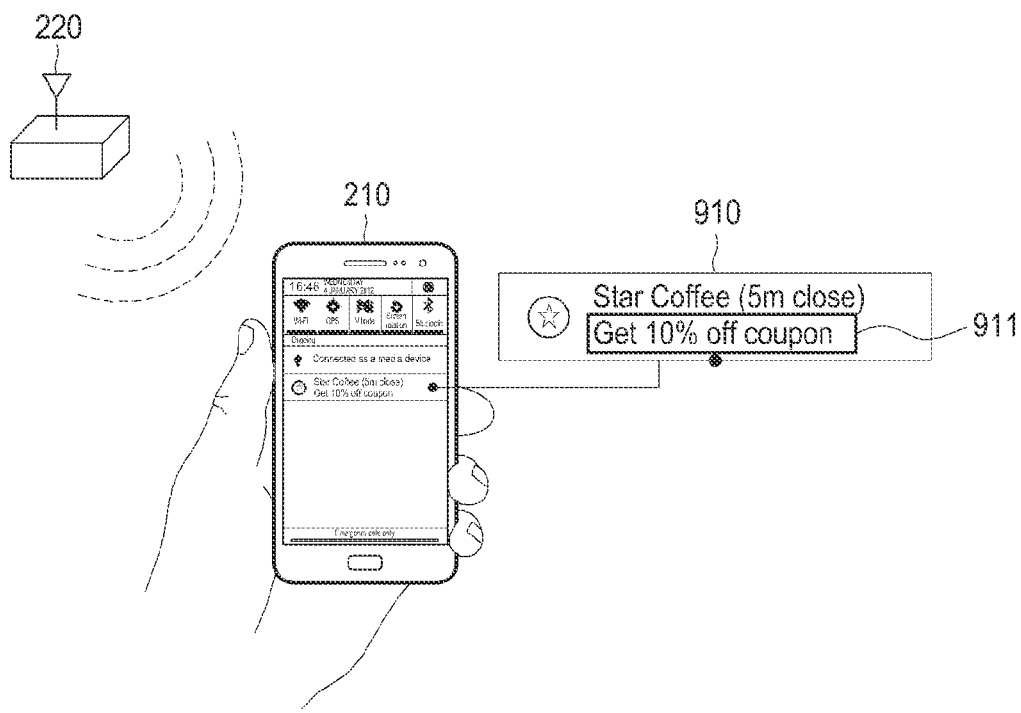
FIG. 9 illustrates a notification message according to an embodiment of the present disclosure.

According to various embodiments of the present disclosure, the notification message ID 233 may include information indicating a notification message in at least one of field of the service information packet. The information indicating the notification message may be, for example, an index indicating a message, or may be a notification message itself. The notification message may be text, such as, 'Get 10% off coupon' as illustrated in FIG. 9. In addition, as another example, the information indicating the notification message may be voice, an image, a sound, and/or the like.

According to various embodiments of the present disclosure, the digital signature 234 may be obtained through the service device 220 by encoding a partial area of a service information packet using a private key. The private key may be, for example, an encryption key that is decided in advance by a predetermined user or a service application for providing service information to the predetermined user. For example, when a user receives service information from a company that provides service information, the user may decode a packet received from the predetermined company using a previously decided public key, which is included in a service application or a service of the company. The private key may be different for each company, and may be different for each service of a company that provides service information.

Figure 3A:
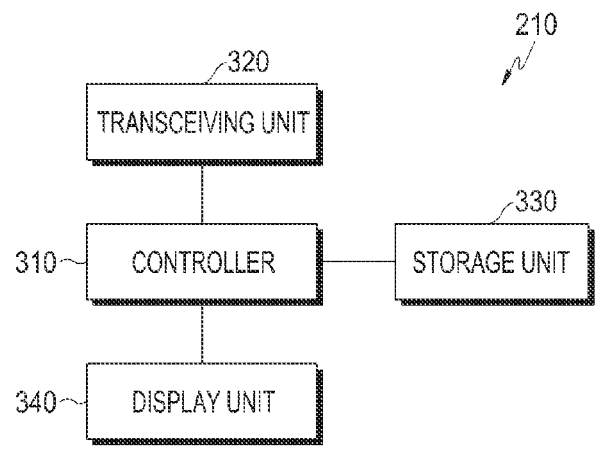
FIG. 3A is a block diagram of an electronic device according to an embodiment of the present disclosure.
Figure 3B:
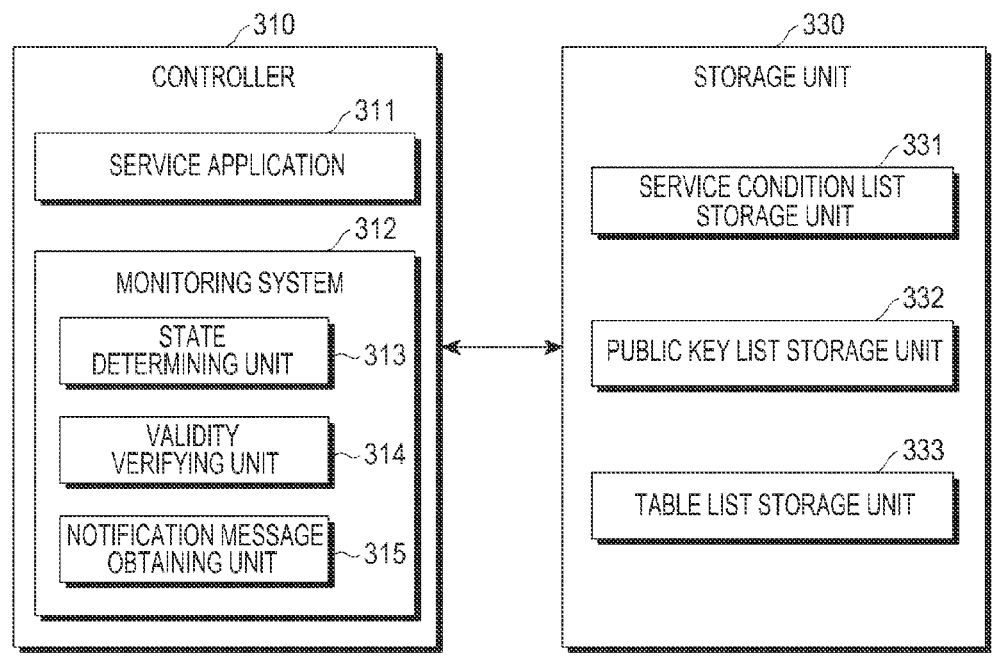
FIG. 3B is a block diagram of a controller that controls service information in an electronic device, and a storage unit, according to embodiment of the present disclosure.

FIGS. 3A and 3B are block diagrams of an electronic device that provides a service according to various embodiments of the present disclosure.

FIG. 3A is a block diagram of an electronic device according to various embodiments of the present disclosure, and FIG. 3B is a block diagram of a controller that controls a service in an electronic device, and a storage unit, according to various embodiments of the present disclosure.

Referring to FIG. 3A, the electronic device 210 may be configured to include a controller 310, a transceiving unit 320, a storage unit 330, and a display unit 340.

According to various embodiments of the present disclosure, the transceiving unit 320 may include a mobile communication unit (not illustrated), a sub-communication unit (not illustrated), a wireless Local Area Network (LAN) (not illustrated), a short-range communication unit (not illustrated), and/or the like, based on a communication scheme, a transmitting distance, and a type of data transmitted and received. The transceiving unit 320 enables the electronic device 210 to be connected with an external device through mobile communication using one or more antennas (not illustrated) under a control of the controller 310. In addition, the transceiving unit 320 may receive various sound tables via an external service (not illustrated) or the Internet network. The mobile communication unit may transmit/receive a wireless signal for a voice call, a video call, a Short Message Service (SMS), a Multimedia Message Service (MMS), and/or the like to/from a portable phone (not illustrated), a smart phone (not illustrated), a tablet PC, or another electronic device (not illustrated), which has a phone number input to the electronic device 210. The sub-communication unit may include at least one of the wireless LAN unit (not illustrated), the short-range communication unit (not illustrated), a monitoring system, a service application, and/or the like. For example, the sub-communication unit may include only the wireless LAN unit, or only the short-range communication unit, or both wireless LAN unit and the short-range communication unit. Further, the sub-communication unit may transmit and receive a control signal to/from the input unit. In addition, when the sub-communication unit includes a monitoring system and a service application, the sub-communication unit may execute short-range communication even when an Application Processor (AP) and/or the like is in a sleep state.

In addition, according to various embodiments of the present disclosure, the sub-communication unit may determine whether a received service information packet is matched to a service ID stored in advance and a service condition corresponding to the service ID. In addition, when condition a corresponding service ID and a service condition are matched (e.g., in response to determining that the received service information matches a service ID stored in advance), a corresponding service application may be called using the corresponding service ID even when the service application is in the sleep state. The service application may be included in a controller, or may be embodied in an electronic device as a separate component from the controller.

According to various embodiments of the present disclosure, a control signal transmitted and received between the electronic device 210 and an input unit may include at least one of a field for supplying power to the input unit, a field for sensing (e.g., detecting) a touch or a hovering between the input unit and the display unit 340, a field for sensing (e.g., detecting) a pressure or an input on a button included in the input unit, an identifier of the input unit, and a field indicating an X axis coordinate and a Y axis coordinate of the location of the input unit. Further, the input unit transmits a feedback signal for a control signal received from the electronic device 210, to the electronic device 210.

The wireless LAN unit may access the Internet in a place at which a wireless AP (not illustrated) is installed, under a control of the controller 310. The wireless LAN unit supports the wireless LAN standards (IEEE 802.11x) of the Institute of Electrical and Electronics Engineers (IEEE). The short-range communication unit may wirelessly perform short-range communication between the electronic device 210 and an image forming apparatus (not illustrated) under a control of the controller 310. A short-range communication scheme may include a Bluetooth communication scheme, an Infrared Data Association (IrDA) communication scheme, a WiFi-Direct communication scheme, a NFC scheme, and/or the like. In addition, according to various embodiments of the present disclosure, a wireless LAN unit may include at least one of a component element of a monitoring system and a service application. In this instance, short-range communication may be executed when an AP is in the sleep state.

In addition, according to various embodiments of the present disclosure, the wireless LAN unit may determine whether a received service information packet is matched to a service ID stored in advance and a service condition corresponding to the service ID. In addition, when a corresponding service ID and a service condition are matched, a corresponding service application may be called using the corresponding service ID even when the service application is in the sleep state.

In addition, according to various embodiments of the present disclosure, the short-range communication unit may determine whether a received service information packet is matched to a service ID stored in advance and a service condition corresponding to the service ID. In addition, when a corresponding service ID and a service condition are matched, a service application may be called using the corresponding service ID even when the service application is in the sleep state.

The controller 310 may communicate with a near or remote communication device through at least one of the sub-communication unit, the wireless LAN unit, and the short-range communication unit, may perform a control to receive various data including an image, an emoticon, a photograph, and/or the like through an Internet network, and may communicate with the input unit. The communication may be performed by a transmission and reception of the control signal.

According to various embodiments of the present disclosure, the transceiving unit 320 may receive a service information packet from a service device. The service information packet may include at least one of a service ID, a service condition, a notification message ID, a digital signature, and/or the like.

In addition, for example, the service information packet may be a message that may be set by an application for supporting a service corresponding to a predetermined company (e.g., Starbucks or Subway) or a manager server and a service server. In addition, a service ID, a service condition, a notification message ID, and a digital signature may be determined based on the message, and the application or the manager server and service server may additionally set a service condition.

As another example, the transceiving unit 320 that receives the service information packet may transfer the service information packet to another electronic device, and the other electronic device drives an application corresponding to the received service information packet so as to output service information.

According to various embodiments of the present disclosure, the controller 310 may include a Central Processing Unit (CPU), a Read Only Memory (ROM) storing a control program for controlling the electronic device 210, a Random Access Memory (RAM) used as a storage area for storing a signal or data input from the outside of the electronic device 210 or for work performed in the electronic device 210, and/or the like. The CPU may include a single core CPU, a multiple core CPU (e.g., a dual core CPU, a triple core CPU, a quad core CPU, and/or the like).

According to various embodiments of the present disclosure, the controller 310 may control at least one of the transceiving unit 320, the storage unit 330, and the display unit 340.

According to various embodiments of the present disclosure, when a service information packet is received from a service device through the transceiving unit 320 (e.g., in response to receiving the service information packet from the service device), the controller 310 compares a service ID of the service information packet and a registered service ID of the electronic device 210, and determines whether a service condition of the service information packet and a previously registered condition of the electronic device 210 are matched.

According to various embodiments of the present disclosure, the controller 310 determines whether a service ID included in a received service information packet is a previously registered ID, determines whether a service condition corresponding to the service ID and a previously registered condition are matched, and outputs service information. The service information may include, for example, information associated with a coupon, an event, a notification, and/or the like. As another example, a corresponding application may be executed based on mapping.

The controller 310 may verify the validity of the service information packet and the service device. The controller 310 may decode a received service information packet using a public key stored in advance in the electronic device 210. The received packet may be a packet encoded by a service device that broadcasts (or otherwise communicates) the service information packet using a private key for service. The controller 310 obtains a notification message using an index included in the service information packet, and outputs the notification message. The notification message may be output using at least one of a service server address (e.g., Uniform Resource Locator (URL)) and a type of event included in the index, and the notification message may be different for each type of business that provides the service. The service information packet may be received through WiFi and Bluetooth. In addition, the controller 310 may output at least one of voice, text, an address value (URL), an image, and/or the like corresponding to service information.

According to various embodiments of the present disclosure, the electronic device 210 may execute at least one of an operation of receiving a service information packet in the state in which a service application is in a sleep state, an operation of determining whether a service ID included in the received service information packet is a previously registered service ID, and an operation of determining whether a service condition corresponding to the service ID and a previously registered condition are matched, and outputting service information.

According to various embodiments of the present disclosure, the controller 310 may exist in a separate sensor controller included in the transceiving unit 320, as opposed to the service application. In this example, the controller 310 may operate separately from the service application of the electronic device, and may execute short-range communication when the service application is in the sleep state. In addition, the controller 310 may determine whether a received service information packet is matched to a service ID stored in advance and a service condition corresponding to the service ID. According to various embodiments of the present disclosure, when a corresponding service ID and service condition are detected (e.g., in response to detecting the corresponding service ID and the service condition), the controller 310 may call a service application using the corresponding service ID so as to wake up an application processor. This enables a service application to operate only when the condition is matched and thus, the consumption of a battery may be reduced.

According to various embodiments of the present disclosure, the controller 310 determines whether a service ID included in a service information packet received from a service device corresponds to a service ID previously registered on the electronic device, determines whether a service condition corresponding to a service ID included in the received service information packet and a service condition corresponding to a service ID previously registered on the electronic device 210 are matched, decodes the service information packet using a previously stored public key, verifies validity with respect to the service information packet and the service device, and provides service information through an address value of a service server corresponding to an index included in the service information packet.

According to various embodiments of the present disclosure, the controller 310 may verify the validity of the service device and the service information packet determining whether the service ID of the service information packet and the registered service ID of the electronic device 210 are identical. For example, the controller 310 may verify the validity of the service device and the service information packet by only determining whether the service ID of the service information packet and the registered service ID of the electronic device 210 are identical According to various embodiments of the present disclosure, the controller 310 may only determine whether the service condition of the service information packet and the service condition registered on the electronic device 210 are matched, and when (e.g., if) the service condition of the service information packet and the service condition registered on the electronic device 210 are matched, the controller 310 may proceed with a process of verifying the validity of the service device and the service information packet.

According to various embodiments of the present disclosure, to verify validity of a broadcasting packet, the controller 310 may register a service ID and a public key corresponding to a predetermined service on a public key list included in a monitoring system, through a service application corresponding to the predetermined service. Accordingly, the controller 310 may decode a digital signature part of the service information packet using a public key stored in the public key list included in the monitoring system. Subsequently, the controller 310 compares the decoded service information packet and an original part and, when the decoded service information packet and the original part are identical, may verify the validity of the service device 220 and the service information packet.

According to various embodiments of the present disclosure, the display unit 320 generates at least one loop module, and receives at least one touch trough a body part of a user (e.g., a finger including a thumb) and a touch input unit (e.g., a stylus pen or an electronic pen) for executing the at least one generated loop module and outputting sound. Further, the display unit 320 may include a hovering recognition unit and a touch recognition unit which may recognize an input based on a corresponding input mode, when an input is provided through a pen such as a stylus pen or an electronic pen. The hovering recognition unit recognizes a distance between a pen and a screen through a magnetic field, an ultrasonic wave, optical information, or a surface acoustic wave, and the touch recognition unit senses (e.g., detects) a position at which a touch is input through an electric charge moved by the touch. The touch recognition unit may sense (e.g., detect) all touches capable of generating static electricity, and also may sense (e.g., detect) a touch of a finger or a pen which is an input unit. In addition, the display unit may transmit an analog signal corresponding to at least one gesture to a screen controller.

According to various embodiments of the present disclosure, the display unit 320 may provide a user with a notification message so as to show execution of a service and notification of a service to the user. For example, the notification message may be a message, such as, 'Get 10% off coupon'. In addition, text, an image, an address value, and/or the like may be included.

According to various embodiments of the present disclosure, the storage unit 310 may store at least one of a character, a word, and a character stream input into the display unit 320, and may store various data such as text, an image, an emoticon, an icon, and/or the like that a user receives over an Internet network. Moreover, the storage unit 310 may store various applications such as a navigation, a video call, a game, a time-based alarm application, and/or the like. The storage unit 310 may store various images for providing a Graphical User Interface (GUI) related to the applications; databases or data related to user information, documents and methods for processing a touch-input. The storage unit 310 may store background images (e.g., a menu screen, a standby screen, and/or the like) or operating programs required for operating the electronic device 200. The storage unit 310 may store images photographed by a camera unit. The storage unit 310 is a non-transitory machine readable medium (e.g., a non-transitory computer-readable storage medium), and the term of the non-transitory machine-readable medium may be defined as a medium for providing data to the machine such that the machine may perform a specific function. The non-transitory machine readable medium may be a storage medium. The storage unit 310 may include a non-volatile medium and a volatile medium. Commands transferred by all of these media are detected by a physical instrument through which the machine reads the commands.

According to various embodiments of the present disclosure, the storage unit 310 may store a service ID, a service condition corresponding to the service ID, and a public key corresponding to a service. In addition, a registered notification message table may be stored.

Referring to FIG. 3B, the controller 310 of the electronic device 210 may include a service application 311 and a monitoring system 312. The monitoring system 312 may be configured to include a state determining unit 313, a validity verifying unit 314, and a notification message obtaining unit 315.

According to various embodiments of the present disclosure, at least one service application 311 may be used, which is for supporting a service provided by a predetermined company (e.g., Starbucks or Subway) that sells a predetermined product or desires consumption of users. The service provided by the predetermined company may include a coupon, a notification, and/or the like provided by the predetermined company. In addition, the service application 311 may support services provided by at least one predetermined company in an integrated manner, and may have connection with a service server of the predetermined company.

According to various embodiments of the present disclosure, the state determining unit 313 may compare a service ID and a service condition included in a service information packet with service IDs of registered services and corresponding service conditions. For example, Tables 1 thorough 4 are provided.

Table 1 shows that both a service ID and a service condition included in a service information packet are identical to a service ID and a service condition registered on the electronic device 210.

TABLE 1

| service ID and service condition registered on electronic device | | | service ID and service condition included in service information packet |
|---|---|---|---|
| Service A | Service B | Service C | Service A |
| Condition A | Condition B | Condition C | Condition A |

Referring to FIG. 1, according to various embodiments of the present disclosure, the state determining unit 313 determines whether a service ID included in a service information packet and a service ID registered on the electronic device 210 are identical, and when the service ID included I the service information packet and the service ID registered on the electronic device 210 are identical, the state determining unit 313 compares a service condition registered on the electronic device 210 and a service condition included in the service information packet. Subsequently, the state determining unit 313 may instruct the validity verifying unit 314 to verify the validity.

Table 2 shows that only service IDs are identical when a service ID and a service condition included in a service information packet are compared with a service ID and a service condition registered on the electronic device 210.

TABLE 2

| service ID and service condition registered on electronic device | | | service ID and service condition included in service information packet |
|---|---|---|---|
| Service A Condition A | Service B Condition B | Service C Condition C | Service A Condition D |

Referring to Table 2, according to various embodiments of the present disclosure, the state determining unit 313 determines whether a service ID included in a service information packet and a service ID registered on the electronic device 210 are identical, and when the service ID included in the service information packet and the service ID registered on the electronic device 210 are identical, the state determining unit 313 compares a service condition registered on the electronic device 210 and a service condition included in the service information packet. When the service conditions are not matched to one another, subsequently, the state determining unit 313 may or may not instruct the validity process of the validity verifying unit 314.

Table 3 shows that only service conditions are identical when a service ID and a service condition included in a service information packet are compared with a service ID and a service condition registered on the electronic device 210.

TABLE 3

| service ID and service condition stored in electronic device | | | service ID and service condition included in service information packet |
|---|---|---|---|
| Service A Condition A | Service B Condition B | Service C Condition C | Service D Condition A |

Referring to Table 3, according to various embodiments of the present disclosure, the state determining unit 313 determines a service ID included in a service information packet and a service ID registered on the electronic device 210, and when the service ID included in the service information packet and the service ID registered on the electronic device 210 are not identical, the state determining unit 313 compares a service condition registered on the electronic device 210 and a service condition included in the service information packet. When the service conditions are matched to one another, subsequently, the state determining unit 313 may or may not instruct the validity process of the validity verifying unit 314.

Table 4 shows that both a service ID and a service condition included in a service information packet are not identical to a service ID and a service condition registered on the electronic device 210.

TABLE 4

| service ID and service condition stored in electronic device | | | service ID and service condition included in service information packet |
|---|---|---|---|
| Service A Condition A | Service B Condition B | Service C Condition C | Service D Condition D |

Referring to Table 4, according to various embodiments of the present disclosure, the state determining unit 313 determines a service ID included in a service information packet and a service ID registered on the electronic device 210, and when the service ID included in the service information packet and the service ID registered on the electronic device are identical, the state determining unit 313 compares a service condition registered on the electronic device 210 and a service condition included in the service information packet. When the service conditions are not matched to one another, subsequently, the state determining unit 313 does not instruct the validity process of the validity verifying unit 314.

According to various embodiments of the present disclosure, the validity verifying unit 314 may determine whether the service device 220 is a reliable device or a service information packet is modulated in the meantime. For example, Tables 5 through 6 are provided.

Table 5 shows, for example, that a public key registered on an electronic device and a private key included in a service information packet are identical.

TABLE 5

| Public key registered on electronic device | Private key included in service information packet |
|---|---|
| Public key A | Private key A |

Referring to Table 5, according to various embodiments of the present disclosure, when public key A registered on the electronic device 210 corresponds to private key A included in a service information packet, the validity verifying unit 314 instructs the notification message obtaining unit 313 to begin a notification message obtaining process. The private key may be, for example, an encryption key that is decided in advance by a predetermined user for providing service information to the predetermined user. For example, when a user receives service information from a company that provides service information, the user may decode a packet received from the predetermined company using a previously decided public key. The private key may be different for each company, and may be different for each service of a company that provides service information.

Table 6 shows, for example, that a public key registered on the electronic device 210 and a private key included in a service information packet are not identical.

TABLE 6

| Public key registered on electronic device | Private key included in service information packet |
|---|---|
| Public key A | Private key B |

Referring to Table 6, according to various embodiments of the present disclosure, when public key A registered on the electronic device 210 does not correspond to private key B included in a service information packet, the validity verifying unit 314 may or may not instruct the notification message obtaining unit 313 to begin a notification message obtaining process.

According to various embodiments of the present disclosure, the notification message obtaining unit 315 obtains a notification message from an index included in a received service information packet. For example, FIG. 7 shows the notification message obtaining process.

In addition, according to various embodiments of the present disclosure, the notification message obtaining unit 315 may exist in a separate service application.

TABLE 7

| Notification message ID and address value registered on electronic device | | Notification message ID included in service information packet |
|---|---|---|
| Index 1 | Starbucks address value (URL) | Index 1 |
| Index 2 | Subway address value (URL) | |

Referring to Table 7, according to various embodiments of the present disclosure, the notification message obtaining unit 315 determines whether the index 1, which is a notification message ID included in a service information packet, corresponds to a notification message ID registered on the electronic device 210. When the determination shows that index 1, which is the notification message ID registered on the electronic device 210, corresponds to the notification message ID included in the service information packet, the electronic device 210 may obtain a notification message using an address value of a service (e.g., Starbucks, and/or the like) corresponding to the notification message ID.

According to various embodiments of the present disclosure, the storage unit 330 may be configured to include a service condition list storage unit 331 that stores one or more service conditions, a public key list storage unit 332 that stores one or more public keys, and a table list storage unit 333 that stores a notification message ID and an address value. The storage unit 330 may store the service condition list storage unit 331, the public key list storage unit 332, and the table list storage unit 333, in accordance with the electronic device 210.

The service condition list storage unit 331 is a table including a list of service conditions corresponding to each service ID.

TABLE 8

| Service ID | Service Condition | | |
|---|---|---|---|
| Service A | Location | Event type | User class |
| Service B | User class | Location | Event type |
| Service C | Event type | Location | User class |

Referring to Table 8, for example, when a service device of which a service ID is service A broadcasts (or otherwise communicates) a service information packet, the service information packet may be broadcasted (or otherwise communicated) in a form of location field, event type field, user class field, and/or the like. As another example, when a service device of which a service ID is service B broadcasts (or otherwise communicates) a service information packet, the service information packet may be broadcasted (or otherwise communicated) in a form of user class, location, event type, and/or the like.

For example, although the service information packet broadcasted (or otherwise communicated) by a service device may have an identical size and format, different information may be included in each field of a packet based on a type of service or a type of company.

For example, when a service condition field of a service information packet broadcasted (or otherwise communicated) by service device A is {00x0, 00x1, 00x2}, an electronic device that stores the service condition list storage unit of Table 8 may use 00x0 of the service information packet to indicate a location, use 00x1 to indicate a type of event, and use 00x2 to indicate a user class. When a service condition field of a service information packet broadcasted (or otherwise communicated) by service device B is { 00x0, 00x1, 00x2}, an electronic device that stores the service condition list storage unit of Table 8 may use 00x0 of the service information packet to indicate a user class, use 00x1 to indicate a location, and use 00x2 to indicate an event type.

For example, the electronic device 210 may primarily classify a service device based on a service ID included in a service information packet, and may classify a service condition based on a service type as described in the above descriptions.

The public key list storage unit 332 is a table storing a public key corresponding to a service ID.

TABLE 9

| Service ID | Public key |
|---|---|
| Service A | Public key A |
| Service B | Public key B |
| Service C | Public key C |

Referring to Table 9, the public key list storage unit 332 may map a corresponding public key to a service ID and store the same.

The table list storage unit 333 is a table indicating a notification message ID and an address value used for the electronic device 210 to obtain a notification message.

TABLE 10

| Notification message ID and address value registered on electronic device | |
|---|---|
| Index 1 | Starbucks address value (URL) |
| Index 2 | Subway address value (URL) |

Referring to Table 10, the table list storage unit 333 may store a notification message ID and a service address value corresponding to the notification message ID.

The embodiment that has been described with reference to FIGS. 3A and 3B assumes the case in which the service application 311 or the monitoring system 312 is included in a controller.

According to various embodiments of the present disclosure, a state determining unit, a validity verifying unit, and a notification message obtaining unit of the monitoring system may be separately embodied in an electronic device as separate component elements, and at least one of the state determining unit, the validity verifying unit, and the notification message obtaining unit may be coupled and embodied as a separate device in the electronic device. Alternatively, at least one of the state determining unit, the validity verifying unit, and the notification message obtaining unit may be coupled and included in at least one of the transceiving unit 320, the display unit 340, and the storage unit 330, which are component elements of the electronic device. In addition, the service application 311 may be coupled with at least one of the state determining unit, the validity verifying unit, and the notification message obtaining unit of the monitoring system, and embodied in the electronic device as a separate component element, or may be embodied in the transceiving unit, the display unit, or the storage unit of the electronic device.

According to various embodiments of the present disclosure, the state determining unit 313 determines whether a service ID included in the received service information packet corresponds to a registered service ID, determines whether a service condition corresponding to the service ID and a registered condition are matched, and displays information corresponding to the matched condition. In addition, the validity verifying unit 313 decodes the received service information packet using a public key stored in the electronic device. The received service information packet may be a packet encoded by a service device that broadcasts (or otherwise communicates) the service information packet, using a private key for service. In addition, as the service application 311 is in a sleep state, the state determining unit 313 determines whether a service ID included in the received service information packet corresponds to a registered service ID, determines whether a service condition corresponding to the service ID and a registered condition are matched, and displays information corresponding to the matched condition. In addition, the notification message obtaining unit 315 may obtain a notification message using an index included in the service information packet, and may perform a control to output the notification message on a display unit. The notification message may be output using at least one of a service server address and a type of event included in the index, and the notification message may be different for each type of business that provides the service.

According to various embodiments of the present disclosure, an electronic device that provides service information may include a transceiving unit that receives a service information packet, and a controller that determines whether a service ID included in the received service information packet corresponds to a registered service ID, determines whether a service condition corresponding to the service ID and a registered condition are matched, and displays information corresponding to the matched condition.

According to various embodiments of the present disclosure, the controller may decode the received service information packet using a public key stored in the electronic device, and the received service information packet may be a packet that is encoded by a service device that broadcasts (or otherwise communicates) the service information packet, using a private key for service. In addition, the controller may provide at least one of execution of an application, a coupon, and notification of an event, based on the matched condition. The electronic device may include a service application, and the service application may be in a sleep state. In addition, the electronic device may include a display unit that outputs information corresponding to the matched condition through at least one of voice, text, an address value, and an image.

According to various embodiments of the present disclosure, an electronic device that provides service information may further include a display unit that obtains a notification message using an index included in the service information packet, and outputs the notification message. The notification message may be output using at least one of a service server address and a type of event included in the index, and the notification message may be different for each type of business that provides the service.

Figure 4A:
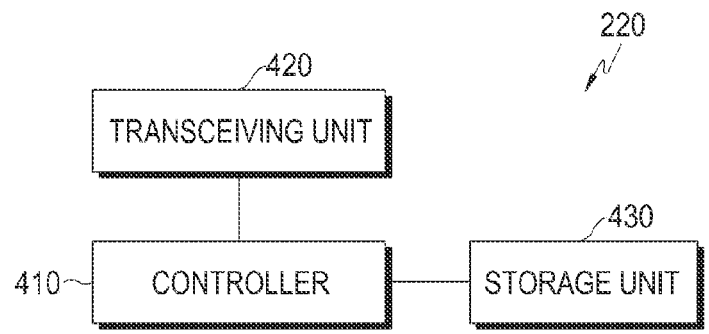
FIG. 4A is a block diagram of a service device according to an embodiment of the present disclosure.
Figure 4B:
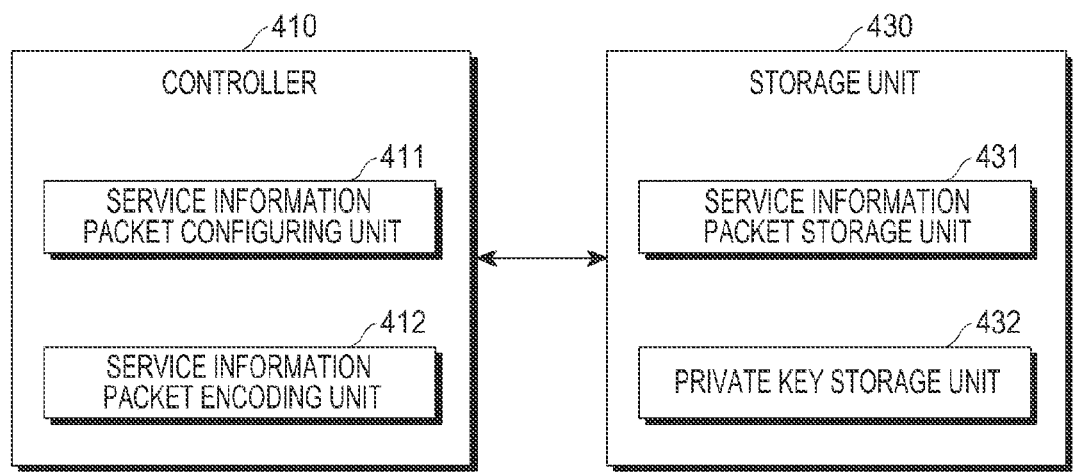
FIG. 4B is a block diagram of a controller and a storage unit of a service device according to an embodiment of the present disclosure.

FIGS. 4A and 4B are diagrams illustrating a configuration of a service device, and a controller and a storage unit of the service device according to various embodiments of the present disclosure.

FIG. 4A is a block diagram of a service device according to various embodiments of the present disclosure, and FIG. 4B is a block diagram of a controller and a storage unit of the service device according to various embodiments of the present disclosure.

Referring to FIG. 4A, the electronic device 220 may be configured to include a controller 410, a transceiving unit 420, and a storage unit 430.

According to various embodiments of the present disclosure, the transceiving unit 420 may broadcast (or otherwise communicate) a service information packet to an electronic device. In addition, the transceiving unit 420 may be wiredly or wirelessly connected with a service server and a manager and thus, may update a service information packet including a private key, a service condition, and the like. In addition, the transceiving unit 420 may broadcast (or otherwise communicate) a service information packet, including at least one of a service ID, a service condition, a notification message ID, and an encoded digital signature. The service ID 231 may be determined based on a type of business that provides service information, and may be, for example, an ID that is allocated based on a server operated by a predetermined company (e.g., Starbucks or Subway) that sells a predetermined product or desires consumption of users. As another example, the service ID 231 may be provided separately based on a corresponding branch of a predetermined company or a type of service. The service ID 231 may be stored in a terminal when a service application is installed, and may store information to correspond to the application. The service condition 232 may be a condition determined by a predetermined company for providing a service to a user. For example, a service condition may be information including a location of a service device, a type of event, a class of a user, and/or the like, and information indicating the service condition may be included in at least one of field of a service information packet. In addition, the service condition may further include a predetermined date, the number of visitors in a shop including the service device 220, and/or the like. The notification message ID 233 may include information indicating a notification message in at least one of field of the service information packet. The information indicating the notification message may be, for example, an index, and the notification message may be, for example, text, such as 'Get 10% off coupon' illustrated in FIG. 9. In addition, as another example, the information indicating the notification message may be voice or an image. The digital signature 234 may be obtained through the service device 220 by encoding a part of a service information packet using a private key.

According to various embodiments of the present disclosure, the controller 410 encodes a partial area of a service information packet broadcasted (or otherwise communicated) by the service device 220 using a private key so as to generate a digital signature, and includes the digital signature in the service information packet. In addition, the controller 410 may perform a control to transmit, to at least one electronic device, a service information packet, including at least one of a service ID, a service condition, a notification message ID, an encoded digital signature, and/or the like.

According to various embodiments of the present disclosure, the storage unit 430 may store a private key required for a broadcasted (or otherwise communicated) service information packet. The private key may be, for example, an encryption key that is agreed upon in advance by a predetermined user for providing service information to the predetermined user. For example, when a user receives service information from a company that provides service information, the user may decode a packet received from the predetermined company using a previously agreed upon public key. The private key may be different for each company. In addition, the private key may be different for each service of a company that provides service information.

Referring to FIG. 4B, the controller 410 of a service device may be configured to include a service information packet configuring unit 411 and a service information packet encoding unit 412.

According to various embodiments of the present disclosure, the service information packet configuring unit 411 may configure a service information packet that the service device desires to broadcast (or otherwise communicate). When the service information packet encoding unit 412 generates a digital signature by encoding a partial area of a service information packet using a private key, the digital signature may be included in the service information packet.

According to various embodiments of the present disclosure, the service information packet encoding unit 412 may generate an encoded digital signature by encoding a partial area of a service information packet using a private key. In addition, the service information packet encoding unit 412 may generate the encoded digital signature by encoding the entire service information packet using a private key.

The storage unit 430 of the service device may be configured to include a service information packet storage unit 431 and a private key storage unit 432.

According to various embodiments of the present disclosure, the service information packet storage unit 431 may store a service information packet that the service device desires to broadcasts—(or otherwise communicate), and may reflect information updated by a service server and a manager to a service information packet and stores the same.

According to various embodiments of the present disclosure, the private key storage unit 432 may store a private key required when the service information packet encoding unit 412 generates a digital signature so as to encode a part or the entirety of a service information packet.

For ease of description, although the above described embodiment illustrates that the controller is located outside the transceiving unit, the controller may be included in the transceiving unit and controls the transceiving unit according to an embodiment of the present disclosure. For example, at least one component element of a plurality of component elements included in the controller may be included in the transceiving unit. For example, at least one of a state determining unit, a validity verifying unit, a notification message obtaining unit, and a service application included in a monitoring system of the controller may be included in the transceiving unit, and may control the transceiving unit.

Figure 5:
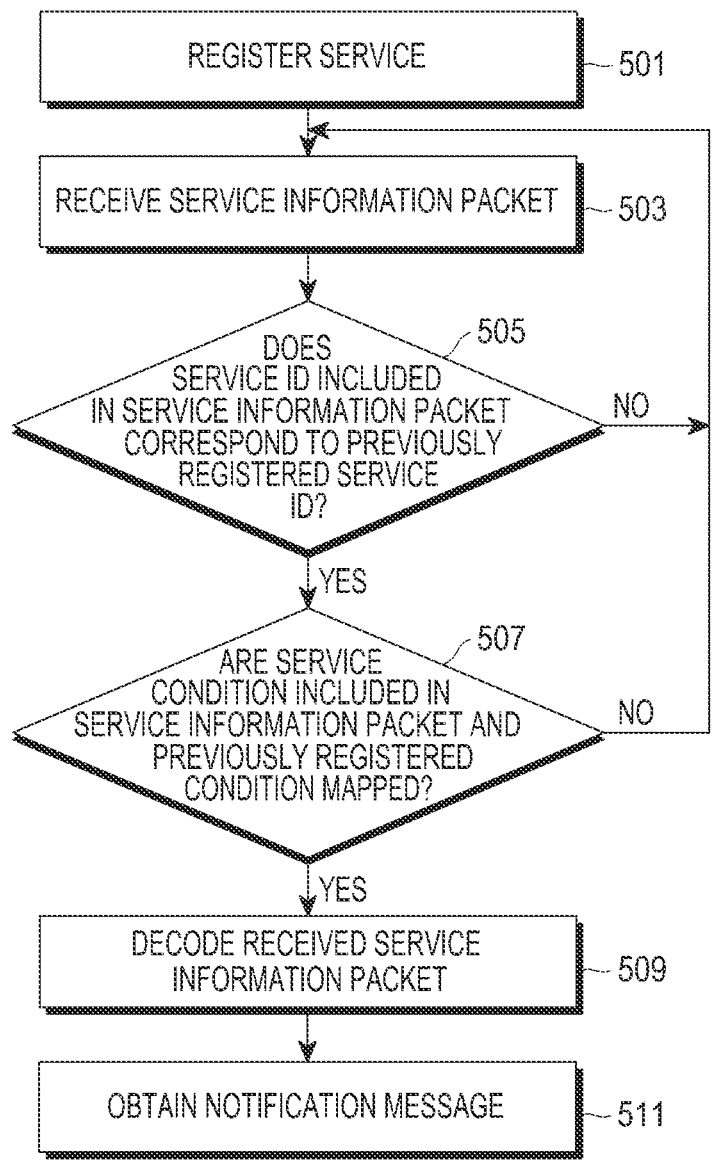
FIG. 5 is a flowchart of operations of an electronic device according to an embodiment of the present disclosure.

FIG. 5 is a flowchart of operations in which an electronic device outputs service information according to an embodiment of the present disclosure.

Referring to FIG. 5, according to an embodiment of the present disclosure, at operation 501, an electronic device registers a service. The service may include a service ID, a service condition, a notification message ID, a digital signature, and/or the like in a service information packet. The service ID may be determined based on a type of business that provides service information, and may be, for example, an ID that is allocated based on a server operated by a predetermined company (e.g., Starbucks, Subway, and/or the like) that sells a predetermined product or desires consumption of users. As another example, the service ID may be provided separately based on a corresponding branch of a predetermined company or a type of service. Accordingly, the service ID may be received from a server operated by a predetermined company, and may register the same. The service condition may be a condition determined by a predetermined company for providing a service to a user. For example, a service condition may be information including a location of a service device, a type of event, a class of a user, and/or the like, and information indicating the service condition may be included in at least one of field of a service information packet. In addition, the service condition may further include a predetermined date, the number of visitors in a shop including a service device, and/or the like. Accordingly, the service condition may be registered by an application of the electronic device. The notification message ID may include information indicating a notification message in at least one of field of the service information packet. The information indicating the notification message may be, for example, an index, and the notification message may be, for example, text, such as 'Get 10% off coupon' illustrated in FIG. 9. In addition, as another example, the information indicating the notification message may be a voice, an image, a sound, and/or the like. Accordingly, the electronic device may receive the notification message ID from a service server or a service device, and may register the same.

According to various embodiments of the present disclosure, the digital signature 234 may be obtained through the service device 220 by encoding a part of a service information packet using a private key. The private key may be, for example, an encryption key that is agreed upon in advance by a predetermined user for providing service information to the predetermined user. For example, when a user receives service information from a company that provides service information, the user may decode a packet received from the predetermined company using a previously agreed upon public key. The private key may be different for each company, and may be different for each service of a company that provides service information. Accordingly, the public key may be received from a server, a service device, and another electronic device, which correspond to a predetermined company, and may be registered.

According to various embodiments of the present disclosure, at operation 503, the electronic device receives a service information packet from a service device. The service information packet may be a message that may be set by an application for supporting a service corresponding to a predetermined company (e.g., Starbucks or Subway) or a manager server and a service server. In addition, an application of the electronic device, a manager service, and a service server may additionally set a service condition, and a service ID, a service condition, a notification message ID, and a digital signature may be included, depending on a message. In addition, as another example, the service information packet may be transferred from another neighboring electronic device.

According to various embodiments of the present disclosure, at operation 505, the electronic device determines whether a service ID included in the service information packet is a registered service ID.

If the electronic device determines that the service ID included in the service information packet does not correspond to (e.g., is not identical to) the previously registered service ID at operation 505, then the electronic device returns to operation 503 to receive a different type of service information packet.

In contrast, if the electronic device determines that the service ID included in the service information packet corresponds to (e.g., is identical to) the registered service ID at operation 505, then the electronic device proceeds to operation 507 at which the electronic device determines whether a service condition included in the service information packet and a registered condition are matched.

If the electronic device determines that the service condition included in the service information packet and the registered condition are not matched at operation 507, then the electronic device returns to operation 503 to receive a different type of service information packet.

In contrast, if the electronic device determines that the service condition included in the service information packet and the registered condition are matched at operation 507, then the electronic device proceeds to operation 509 at which the electronic device decodes the received service information packet using a public key.

According to various embodiments of the present disclosure, at operations 505 through 509, it is illustrated that both the service ID and the service condition registered on the electronic device are identical to the service ID and the service condition included in the service information packet, and accordingly, the received service information packet is decoded using a public key. However, according to various embodiments of the present disclosure, only the service IDs are identical among the service ID and the service condition registered on the electronic device and the service ID and the service condition included in the service information packet, and accordingly, the electronic device may decode the received service information packet using a public key. In addition, only the service conditions are identical among the service ID and the service condition registered on the electronic device and the service ID and the service condition included in the service information packet, and accordingly, the electronic device may decode the received service information packet using a public key.

Subsequently, at operation 511, the electronic device obtains a notification message. For example, the electronic device may obtain a notification message from an index included in the received service information packet. The index included in the service information packet may be a notification message ID. The electronic device determines the index, and obtains the notification message by using the index. For example, the electronic device determines whether index 1, which is a notification message ID included in the service information packet, corresponds to a notification message ID registered on the electronic device. When the determination shows that index 1, which is the notification message ID registered on the electronic device, corresponds to the notification message ID included in the service information packet, the electronic device may obtain a notification message using an address value of a service corresponding to the notification message ID. In addition, as another example, the electronic device stores a table including a notification message ID and a notification message corresponding to the notification message ID, and the table may be obtained from a service server or a service device. The electronic device may display or execute information corresponding to the matched condition. For example, information corresponding to the matched condition may include a coupon, notification of an event, and the like. As another example, the electronic device may execute a corresponding application based on the matched condition.

Figure 6A:
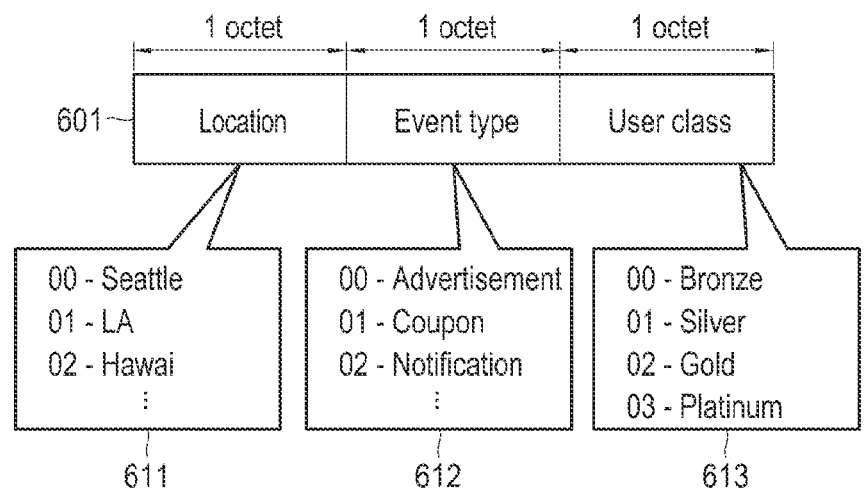
FIG. 6A is a diagram illustrating service condition registration according to an embodiment of the present disclosure.
Figure 6A:
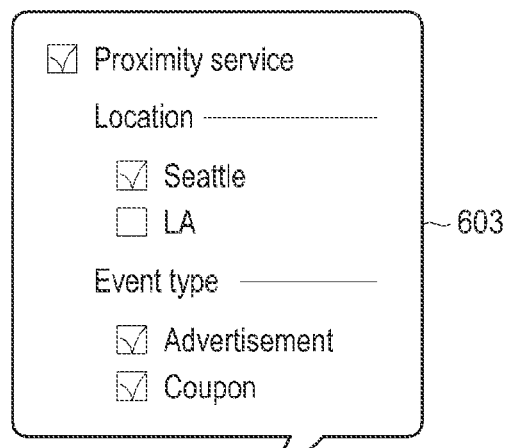
Figure 6B:
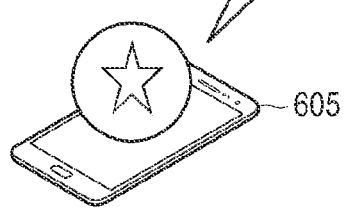
FIG. 6B is a diagram illustrating a service condition field according to an embodiment of the present disclosure.

FIGS. 6A and 6B are diagrams illustrating service condition registration and a service condition field associated with a service information packet, according to various embodiments of the present disclosure.

FIG. 6A is a diagram illustrating service condition registration according to various embodiments of the present disclosure, and FIG. 6B is a diagram illustrating a service condition field.

FIG. 6A illustrates a user condition field 601 of a service information packet, and a process 603 of registering a service condition, according to various embodiments of the present disclosure. The user condition field 611 of the service information packet may include, for example, a location field 601, an event type field 612, and a user class field 613.

According to various embodiments of the present disclosure, the location field 611 may be set to include, for example, Seattle corresponding to 00, LA corresponding to 01, and Hawaii corresponding to 02. For example, the condition field 601 may include a predetermined location and a value corresponding to the predetermined location.

According to various embodiments of the present disclosure, the event type field 612 may be set to include, for example, service information corresponding to 00, a coupon corresponding to 01, and a notification corresponding to 02. For example, the event type field 612 may include a value corresponding to an event type provided by a predetermined company and/or the like.

According to various embodiments of the present disclosure, the user class field 613 may be set to include, for example, bronze corresponding to 00, silver corresponding to 01, gold corresponding to 02, and platinum corresponding to 03. For example, the user class field 613 may include a service class associated with a user who is provided with a service and a value corresponding to the service class.

According to various embodiments of the present disclosure, the process 603 of registering a service condition through a service application 605 of the electronic device may set, for example, Seattle for a location item, and may set service information and a coupon for an event type item.

FIG. 6B is a diagram illustrating a service information packet indicating a service condition field of a service device according to various embodiments of the present disclosure.

Referring to FIG. 6B, when a location is set to Seattle, an event is set to a coupon, and a user class is set to gold, as a service condition of a service device, a value of {0x00, 0x01, 0x02} may be input into a service condition field 621 included in a service information packet broadcasted (or otherwise communicated) by the service device. For example, when the service device changes the service condition, the value of the service condition field 621 may be changed based on the changed service condition. Accordingly, even though the service condition is changed, there is no need to reproduce a service device and the service device may be extensively used.

According to various embodiments of the present disclosure, the service device may change a service condition through a manager. The manager may be a service server, and may be a device that has the right to change a service condition of the service device. In this manner, the manager may change the service condition through predetermined authentication, and may encode a partial area of a service information packet using a private key that the service device has. The encoded packet is included in the service information packet for broadcasting (or otherwise communicating).

Figure 7A:
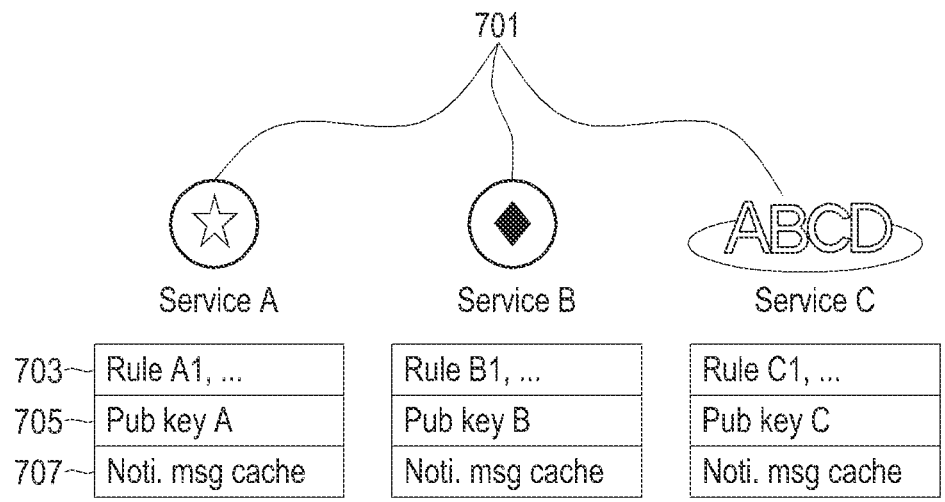
FIG. 7A is a diagram illustrating an electronic device shows a service condition corresponding to a predetermined service according to an embodiment of the present disclosure.
Figure 7B:
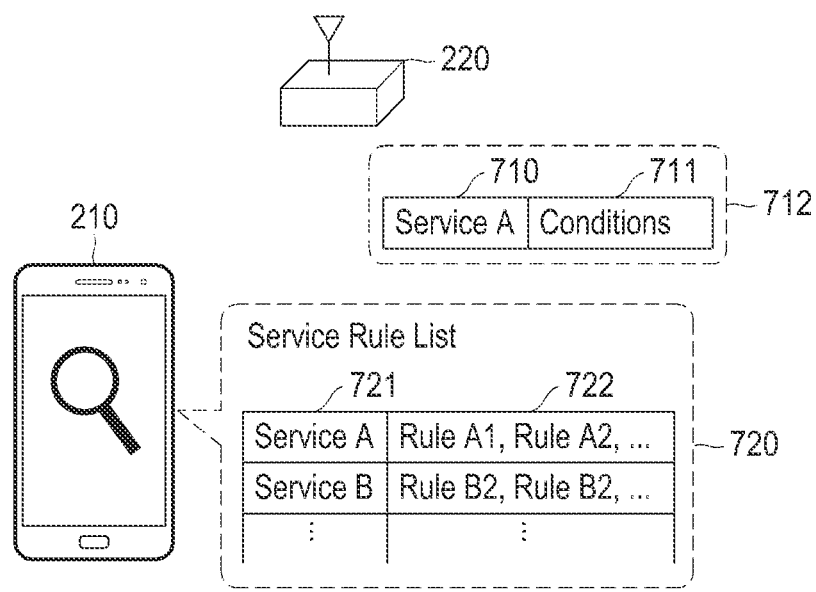
FIG. 7B is a diagram illustrating a service IDentification (ID) and a service condition of a broadcasting packet, and a service ID and a service condition stored in an electronic device, according to an embodiment of the present disclosure.

FIGS. 7A and 7B illustrate a service condition corresponding to a predetermined service, and a service condition list stored in a broadcasting packet and an electronic device according to various embodiments of the present disclosure.

FIG. 7A is a diagram illustrating that an electronic device shows a service condition corresponding to a predetermined service according to various embodiments of the present disclosure, and FIG. 7B is a diagram illustrating a service ID and a service condition of a broadcasting packet, and a service ID and a service condition stored in an electronic device, according to various embodiments of the present disclosure.

Referring to FIG. 7A, there is illustrated a service condition that an electronic device registers on the electronic device for mapping the same to a service condition included in a service information packet, even in the state in which a service application is not executed.

According to various embodiments of the present disclosure, Service A 701, Service B 701, and Service C 701 may be determined based on a type of business that provides service information, and may be, for example, a service corresponding to a predetermined company (e.g., Starbucks, Subway, and/or the like) that sells a predetermined product or desires consumption of users.

For example, a service condition 703 corresponding to Service A, a public key 705 corresponding to Service A, and a notification message ID 707 corresponding to Service A may be stored in the electronic device, in a form of A1, public key A, and notification msg cache (noti msg cache), respectively.

For example, a service condition, a public key, and a notification message ID corresponding to each service may be stored in a form of a table.

FIG. 7B is a diagram illustrating a service ID and a service condition of a broadcasted (or otherwise communicated) packet transmitted by a service device, and a service ID and a service condition stored in an electronic device, according to various embodiments of the present disclosure.

Referring to FIG. 7B, the service device 220 may broadcast (or otherwise communicate) a service information packet 712. The service information packet 712 may include a service ID 710 and a service condition 711. For example, in the case of the service device 220 corresponding to Service A, the service information packet 712 broadcasted (or otherwise communicated) by the service device 220 may include a service ID 710 identical to Service A 710 and a service condition 711 corresponding to the service ID 710. The electronic device 210 may determine whether the service ID 710 of the service information packet 712 is identical to a service ID 721 of a service condition list 720 registered on the electronic device 210. When the electronic device 210 determines that the service ID 710 of the service information packet 712 is identical to the service ID 721 registered on the electronic device 210, the electronic device 210 determines whether the service condition 711 of the service information packet 712 is matched to the previously registered condition 722 of the electronic device 210. Subsequently, the electronic device 210 may proceed with a process of verifying the validity of the service device 220 and a service information packet.

According to various embodiments of the present disclosure that have been described earlier, a service ID of a service information packet and a service ID registered on the electronic device 210 are compared, and whether a service condition of the service information packet and a previously registered condition of the electronic device 210 are matched is determined. Conversely, according to various embodiments of the present disclosure, the electronic device 210 only determines whether a service ID of a service information packet and a registered service ID of the electronic device 210 are identical, and may proceed with a process of verifying the validity of the service device 220 and the service information packet.

According to various embodiments of the present disclosure, the electronic device 210 only determines whether a service condition of a service information packet and a registered service condition of the electronic device 210 are identical, and may proceed with a process of verifying the validity of the service device 220 and the service information packet.

According to various embodiments of the present disclosure, the electronic device 210 may compare a service ID and a service condition included in a service information packet with service IDs of registered services and corresponding service conditions. Accordingly, even when a service information packet has a significantly limited size and includes only limited information, the electronic device 210 compares a service ID and a service condition included in the service information packet with service IDs of services registered on the electronic device 210 and corresponding service conditions, and neutrally applies the same to an individual service. For example, the electronic device 210 may compare a service ID and a service condition included in a service information packet in a binary level.

Figure 8:
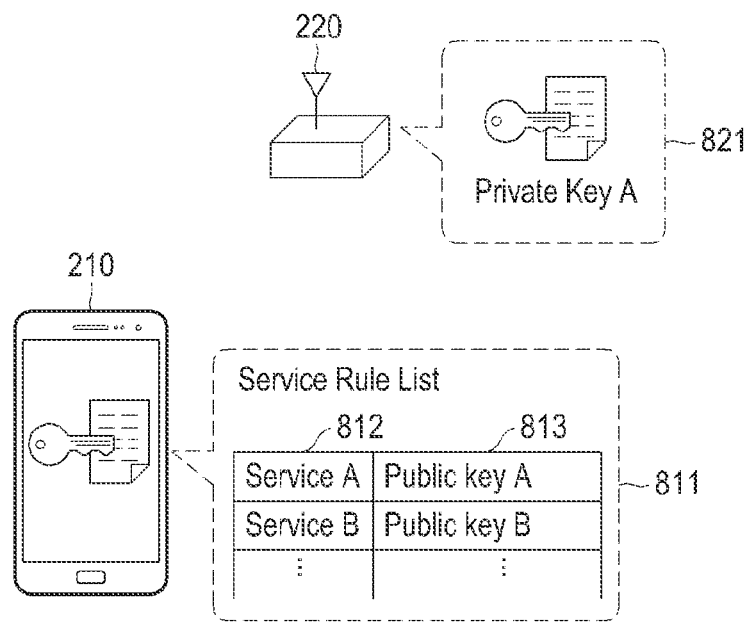
FIG. 8 is a diagram illustrating a process of verifying validity using a private key of a service information packet transmitted from a service device and a public key stored in an electronic device, according to an embodiment of the present disclosure.

FIG. 8 is a diagram illustrating a process of verifying validity using a private key of a service information packet transmitted from a service device and a public key stored in an electronic device, according to an embodiment of the present disclosure.

Referring to FIG. 8, according to various embodiments of the present disclosure, the service device 220 that supports a predetermined service may store a private key 821 corresponding to the predetermined service. Accordingly, a service application corresponding to the predetermined service of the electronic device 210 may register a service ID 812 and a public key 813 corresponding to the predetermined service, on a service rule list 811 included in a monitoring system. The service device 220 may encode a partial area of a service information packet using the private key 821, and an encoded digital signature value may be included in the service information packet again. Subsequently, the service device 220 broadcasts (or otherwise communicates) the service information packet, and the electronic device 210 that receives the same may decode the digital signature of the service information packet using the public key 813 stored in the public key list 811 included in the monitoring system of the electronic device 210. Subsequently, the electronic device 210 compares the decoded service information packet and an original part, and when the decoded service information packet and the original part are identical, may authenticate the validity of the service device 220 and the service information packet. Through this process, the monitoring system of the electronic device 210 may determine whether the service device 220 is a reliable device or whether the service information packet is modulated in a meantime.

FIG. 9 illustrates a notification message according to an embodiment of the present disclosure.

Referring to FIG. 9, according to various embodiments of the present disclosure, the electronic device 210 that receives a service information packet broadcasted (or otherwise communicated) by the service device 220 may include a notification message 910 for showing, to a user, execution of a service and notification of a service. For example, the notification message 910 may include a message 911, such as 'Get 10% off coupon'. However, when the service information packet has a small capacity, the notification message 910 may not be included in the service information packet. Therefore, according to various embodiments of the present disclosure, there is provided a method in which the service device 220 maps the notification message 910 to the service information packet in a form of an index, and broadcasts (or otherwise communicates) the same. The index may correspond to a predetermined service and an ID corresponding to the predetermined service, and may include a message index and the values of variable parts of a message (e.g., message factors).

According to various embodiments of the present disclosure, the electronic device 210 may receive a service information packet broadcasted (or otherwise communicated) by the service device 220, and obtain the notification message 910 from an index included in the service information packet. The notification message 910 may include, for example, text, such as 'Get 10% off coupon,' an image, an address value, and the like. The notification message 910 may be newly added or corrected by a service provider. Therefore, a service application may register a method of obtaining the notification message 910 on the monitoring system, so as to obtain the notification message 910 defined by the service provider, using a message index. The registration for obtaining the notification message 910 may, for example, request a server of a corresponding service to convert a message at a point in time when an event is generated as a message is synchronized in real-time, and registers an address value of the message converting server or the like on the monitoring system.

According to various embodiments of the present disclosure, the electronic device 210 may cache a notification message set for a user. In this instance, a service application may register a cache of a part or the entirety of a notification message table on the monitoring system. Accordingly, the monitoring system may obtain the notification message 910 using the registered notification message table cache.

For example, to update the registered cache information, a notification message synchronize server is not maintained and the notification message table may be updated through periodic application update. A cache may be periodically updated, and when a user is located near a predetermined area, a notification message table cache may be updated only for a notification message associated with the corresponding area.

According to various embodiments of the present disclosure, in a method of providing service information, an electronic device receives a service information packet, and determines whether a service ID included in the received service information packet is a registered service ID. Accordingly, the electronic device may determine whether a service condition corresponding to the service ID and a registered condition are matched, and may display information corresponding to the matched condition. The information corresponding to the matched condition may include, for example, information associated with a coupon, an event, a notification, and/or the like. As another example, information for executing a corresponding application based on mapping may be included. The information corresponding to the matched condition may be output through at least one of voice, text, an address value (URL), and an image.

According to various embodiments of the present disclosure, in a method of providing service information, an electronic device receives a service information packet in the state in which a service application of corresponding service information is in a sleep state, and determines whether a service ID included in the received service information packet is a registered service ID. Accordingly, the electronic device may determine whether the service condition corresponding to the service ID and the registered condition are matched, and when the service condition corresponding to the service ID and the registered condition are matched, the electronic device may control the service application to be in an active state, and may display information corresponding to the matched condition. The information corresponding to the matched condition may be output through at least one of voice, text, an address value (URL), an image, a sound, and/or the like.

According to various embodiments of the present disclosure, in a method of providing service information, an electronic device receives a service information packet in the state in which a service application of corresponding service information is in a sleep state, and determines a service ID by decoding the received service information packet using a public key stored in advance in the electronic device. Further, the electronic device determines whether the service ID included in the received service information packet is a registered service ID, and determines whether a service condition corresponding to the service ID and a registered condition are matched. Accordingly, when the service condition corresponding to the service ID and the registered condition are matched, the electronic device may control the service application to be in an active state, and may display information corresponding to the matched condition. The information corresponding to the matched condition may be output through at least one of voice, text, an address value, an image, a sound, and/or the like. The received packet is merely an example, and the service information packet broadcasted (or otherwise communicated) by a service device may be a packet encoded using a private key for service.

According to various embodiments of the present disclosure, in a method of providing service information, an electronic device receives a service information packet in the state in which a service application of corresponding service information is in a sleep state, and determines a service ID and an index by decoding the received service information packet using a public key stored in advance in the electronic device. Further, the electronic device determines whether the service ID included in the received service information packet is a registered service ID, and determines whether a service condition corresponding to the service ID and a registered condition are matched. In addition, a notification message may be obtained using the determined index, and may be output. The notification message may be different for each type of business that provides the service information, and may be output through at least one of a service server address and a type of event. When the service condition corresponding to the service ID and the registered condition are matched, the electronic device may control the service application to be in an active state, and may display information corresponding to the matched condition. The information corresponding to the matched condition may be output through at least one of voice, text, an address value, an image, and/or the like. The received packet is merely an example, and the service information packet broadcasted (or otherwise communicated) by a service device may be a packet encoded using a private key for service.

According to various embodiments of the present disclosure, there is provided a method of providing service information using an electronic device, and the method includes receiving a service information packet, determining whether a service ID included in the received service information packet corresponds to a registered service ID, determining whether a service condition corresponding to the service ID and a registered condition are matched, and displaying information corresponding to the matched condition. The received service information packet is decoded using a public key stored in advance in the electronic device, and the received packet may be a packet encoded by a service device that broadcasts (or otherwise communicates) the service information packet using a private key for service. In addition, the electronic device may include a service application, and the service application may be in a sleep state. In addition, the electronic device may obtain a notification message using an index included in the service information packet, and may further execute outputting the notification message. The notification message may be output through at least one of a service server address and a type of event included in the index, and the notification message may be different for each type of business that provides the service information. In addition, displaying information corresponding to the matched condition may use at least one of execution of an application, a coupon, notification of an event, and/or the like. The electronic device may output the information corresponding to the matched condition through at least one of voice, text, an address value, an image, a sound, and/or the like.

It will be appreciated that the embodiments of the present disclosure may be implemented in a form of hardware, software, or a combination of hardware and software. Any such software may be stored, for example, in a volatile or non-volatile storage device such as a ROM, a memory such as a RAM, a memory chip, a memory device, or a memory Integrated Circuit (IC), a recordable optical or magnetic medium such as a CD, a DVD, a magnetic disk, or a magnetic tape, regardless of its ability to be erased or its ability to be re-recorded, and a non-transitory machine readable storage medium, (e.g., a non-transitory computer readable storage medium). It is appreciated that the storage unit included in the electronic device is one example of a program including commands for implementing various embodiments of the present disclosure or a non-transitory machine-readable storage medium suitable for storing programs. Accordingly, the present disclosure includes a program that includes a code for implementing an apparatus or a method defined in any claim in the present specification and a non-transitory machine-readable storage medium that stores such a program. Further, the program may be electronically transferred by a predetermined medium such as a communication signal transferred through a wired or wireless connection, and the present disclosure appropriately includes equivalents of the program.

Further, the electronic device can receive the program from a program providing apparatus connected to the device wirelessly or through a wire and store the received program. The program providing device may include a program including instructions allowing the electronic device to perform the method of controlling the screen, a memory for storing information required for the screen control method, a communication unit for performing wired or wireless communication with the electronic device, and a controller transmitting a corresponding program to the electronic device according to a request of the electronic device or automatically.

While the present disclosure has been shown and described with reference to various embodiments thereof, it will be understood by those skilled in the art that various changes in form and details may be made therein without departing from the spirit and scope of the present disclosure as defined by the appended claims and the their equivalents.

What is claimed is:

1. A method of providing service information using an electronic device, the method comprising:
   receiving a service information packet;
   determining whether a service IDentification (ID) included in the received service information packet is a registered service ID;
   determining whether a service condition corresponding to the service ID and a registered condition are matched;
   in response to determining that the service condition corresponding to the service ID and the registered condition are matched, decoding the received service information packet;
   displaying service information corresponding to the matched condition;
   obtaining a notification message using an index included in the service information packet; and
   outputting the notification message,
   wherein the service information is included in the received service information packet, and
   wherein the notification message is output using at least one of a service server address Uniform Resource Locator (URL) and a type of event included in the index, and
   wherein the notification message is different for each type of business that provides service information.

2. The method of claim 1, wherein the received service information packet is decoded using a public key stored in advance in the electronic device, and
   wherein the received service information packet is a packet encoded by a service device that broadcasts the service information packet, using a private key for service.

3. The method of claim 1, wherein the electronic device includes a service application, and
   wherein the service application is in a sleep state.

4. The method of claim 1, wherein the displaying information corresponding to the matched condition uses at least one of an application execution, a coupon, and an event notification.

5. The method of claim 1, further comprising:
   outputting information corresponding to the matched condition through at least one of voice, text, an address value, an image, and a sound.

6. The method of claim 1, wherein the determining whether a service ID included in the received service information packet is a registered service ID comprises:
   determining whether the service ID in the received service information packet corresponds to a service ID registered with the electronic device.

7. The method of claim 1, wherein the service information packet is received from a service device.

8. An electronic device that provides service information, the electronic device comprising:
   a transceiving unit configured to receive a service information packet; and
   a processor configured to:
      determine whether a service IDentification (ID) included in the received service information packet is a registered service ID,
      determine whether a service condition corresponding to the service ID and a registered condition are matched,
      decode the received service information packet in response to determining that the service condition corresponding to the service ID and the registered condition are matched, and display service information corresponding to the matched condition; and a display unit configured to:
- obtain a notification message using an index included in the service information packet, and
- output the notification message,
- wherein the service information is included in the received service information packet,
- wherein the notification message is output using at least one of a service server address Uniform Resource Locator (URL) and a type of event included in the index, and
- wherein the notification message is different for each type of business that provides service information.

9. The electronic device of claim 8, wherein the processor is further configured to decode the received service information packet using a public key stored in advance in the electronic device, and wherein the received service information packet is a packet encoded by a service device that broadcasts the service information packet, using a private key for service.

10. The electronic device of claim 8, wherein the electronic device includes a storage unit storing a service application, and
wherein the service application is in a sleep state.

11. The electronic device of claim 8, wherein the processor is configured to provide at least one of an application execution, a coupon, and an event notification, which correspond to the matched condition.

12. The electronic device of claim 8, further comprising:
a display unit configured to output information corresponding to the matched condition, through at least one of voice, text, an address value, and an image.

13. The electronic device of claim 8, wherein the processor is further configured to determine whether a service ID included in the received service information packet is a registered service ID by determining whether the service ID in the received service information packet corresponds to a service ID registered with the electronic device.

14. The electronic device of claim 8, wherein the service information packet is received from a service device.

15. A non-transitory computer-readable storage medium storing instructions which, when executed by a processor, cause the processor to:
- receive a service information packet;
- determine whether a service IDentification (ID) included in the received service information packet is a registered service ID;
- determine whether a service condition corresponding to the service ID and a registered condition are matched;
- in response to determining that the service condition corresponding to the service ID and the registered condition are matched, decode the received service information packet; and
- display service information corresponding to the matched condition;
- obtaining a notification message using an index included in the service information packet; and
- outputting the notification message,
- wherein the service information is included in the received service information packet,
- wherein the notification message is output using at least one of a service server address Uniform Resource Locator (URL) and a type of event included in the index, and
- wherein the notification message is different for each type of business that provides service information.

* * * * *